United States Patent
Kennedy

(10) Patent No.: US 9,855,173 B2
(45) Date of Patent: Jan. 2, 2018

(54) ALL TERRAIN WHEELCHAIR

(71) Applicant: David Kennedy, Grove City, PA (US)

(72) Inventor: David Kennedy, Grove City, PA (US)

(73) Assignee: TRAC FABRICATION INC., Slippery Rock, PA (US)

( * ) Notice: Subject to any disclaimer, the term of this patent is extended or adjusted under 35 U.S.C. 154(b) by 0 days.

(21) Appl. No.: 14/586,408

(22) Filed: Dec. 30, 2014

(65) Prior Publication Data

US 2016/0184150 A1 Jun. 30, 2016

(51) Int. Cl.
| | |
|---|---|
| *B62D 55/02* | (2006.01) |
| *A61G 5/06* | (2006.01) |
| *B62D 55/12* | (2006.01) |
| *B62D 55/14* | (2006.01) |
| *A61G 5/10* | (2006.01) |
| *B62D 55/24* | (2006.01) |
| *A61G 5/12* | (2006.01) |

(52) U.S. Cl.
CPC .............. *A61G 5/066* (2013.01); *A61G 5/107* (2013.01); *A61G 5/1067* (2013.01); *A61G 5/125* (2016.11); *B62D 55/02* (2013.01); *B62D 55/12* (2013.01); *B62D 55/14* (2013.01); *B62D 55/244* (2013.01); *A61G 2203/14* (2013.01)

(58) Field of Classification Search
CPC ...... A61G 5/066; A61G 5/041; A61G 5/1067; A61G 5/12; A61G 55/12; A61G 55/02
See application file for complete search history.

(56) References Cited

U.S. PATENT DOCUMENTS

| | | | | | |
|---|---|---|---|---|---|
| 3,964,786 | A | * | 6/1976 | Mashuda | A61G 5/006 180/315 |
| 4,077,483 | A | * | 3/1978 | Randolph | A61G 5/04 180/6.5 |
| 4,674,584 | A | * | 6/1987 | Watkins | A61G 5/061 180/8.2 |

(Continued)

*Primary Examiner* — Anne Marie M Boehler
*Assistant Examiner* — Marlon A Arce
(74) *Attorney, Agent, or Firm* — Dunlap, Bennett & Ludwig PLLC; Brendan E. Squire

(57) ABSTRACT

An all terrain wheelchair is provided. The wheelchair includes a frame. The frame includes an upper bracket, a lower bracket, a first side, a second side, a front end and a rear end. At least one motor is mounted to the lower bracket of the frame. A first drive sprocket and a second drive sprocket may be disposed on the first side and the second side respectively. The motor may rotate the first and second drive sprockets. A first track drive wheel is rotatably connected to the first side and a second track drive wheel is rotatably connected to the second side. The first and second track drive wheels each include a wheel sprocket connected to the first and second drive sprockets respectively by a drive chain. A plurality of roller wheels are rotatably connected to each of the first side and the second side. A first track surrounds the plurality of wheels on the first side and a second track surrounds the plurality of wheels on the second side. The first track is driven by the first track drive wheel and the second track is driven by the second track drive wheel. The present invention may further include a seat mounted to the upper bracket and a controller operable to control an output of the at least one motor and a steering of the wheelchair.

17 Claims, 4 Drawing Sheets

(56) References Cited

U.S. PATENT DOCUMENTS

| | | | | |
|---|---|---|---|---|
| 5,395,129 | A * | 3/1995 | Kao | A61G 5/061 180/8.2 |
| 5,397,171 | A * | 3/1995 | Leach | A61F 5/3784 128/875 |
| 6,076,619 | A * | 6/2000 | Hammer | A61G 5/04 180/6.48 |
| 6,325,167 | B1 * | 12/2001 | Jiang | A61G 5/04 180/9.32 |
| 6,857,490 | B2 * | 2/2005 | Quigg | A61G 5/061 180/9.28 |
| 6,866,288 | B2 * | 3/2005 | Martin | A61G 5/006 280/250.1 |
| 7,798,260 | B2 * | 9/2010 | Albright | B62D 33/0604 180/6.7 |
| 8,146,689 | B2 | 4/2012 | Hertema | |
| 8,371,403 | B2 | 2/2013 | Underwood | |
| 8,789,628 | B2 | 7/2014 | Swenson | |

* cited by examiner

ALL TERRAIN WHEELCHAIR

BACKGROUND OF THE INVENTION

The present invention relates to wheelchairs and, more particularly, to an all terrain wheelchair.

A wheelchair is a chair fitted with wheels. The device comes in variations where it may be either manually propelled by the seated occupant turning the rear wheels by hands or electrically propelled by motors. Wheelchairs are used by people for whom walking is difficult or impossible due to illness, injury, or disability.

Individuals with disabilities have difficulty going to places they desire using current wheelchairs. The wheelchairs used today are confined to pavement and ramps. Manual and power wheelchairs currently have a very limited traveling ability for any surface other than hard concrete, pavement, ramps, and other designated areas.

As can be seen, there is a need for an all terrain wheelchair to maneuver over non-paved terrain.

SUMMARY OF THE INVENTION

In one aspect of the present invention, an all terrain wheelchair comprises: a frame comprising an upper bracket, a lower bracket, a first side, a second side, a front end and a rear end; at least one motor mounted to the lower bracket and comprising a first drive sprocket disposed on the first side and a second drive sprocket disposed on the second side, wherein each of the first and second drive sprockets are rotatable by the at least one motor; a first track drive wheel rotatably connected to the first side and a second track drive wheel rotatably connected to the second side, wherein each of the first and second track drive wheel comprises a wheel sprocket connected to one of the first and second drive sprockets by a drive chain; a plurality of roller wheels rotatably connected to each of the first side and the second side; a first track surrounding the plurality of wheels on the first side and a second track surrounding the plurality of wheels on the second side, wherein the first track is driven by the first track drive wheel and the second track is driven by the second track drive wheel; a seat mounted to the upper bracket; and a controller operable to control an output of the at least one motor and a steering of the wheelchair.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a rubber tracked electrically powered all terrain personal mobility wheelchair. The tracked wheelchair of the present invention allows an individual with disabilities to choose their own path of travel regardless of the terrain. The present invention easily travels through dirt, grass, mud, snow, gravel, rocks, etc. The tracked wheelchair of the present invention may use soft compound rubber tracks for the utmost traction. The present invention may further include two high torque DC electric motors which provide an abundance of power to not only climb steep hills but also pull objects such as utility wagons and the like. Further, the present invention may be about 30 inches wide overall, and may therefore travel through a standard doorway and into a handicapped accessible vehicle.

Figure 1:
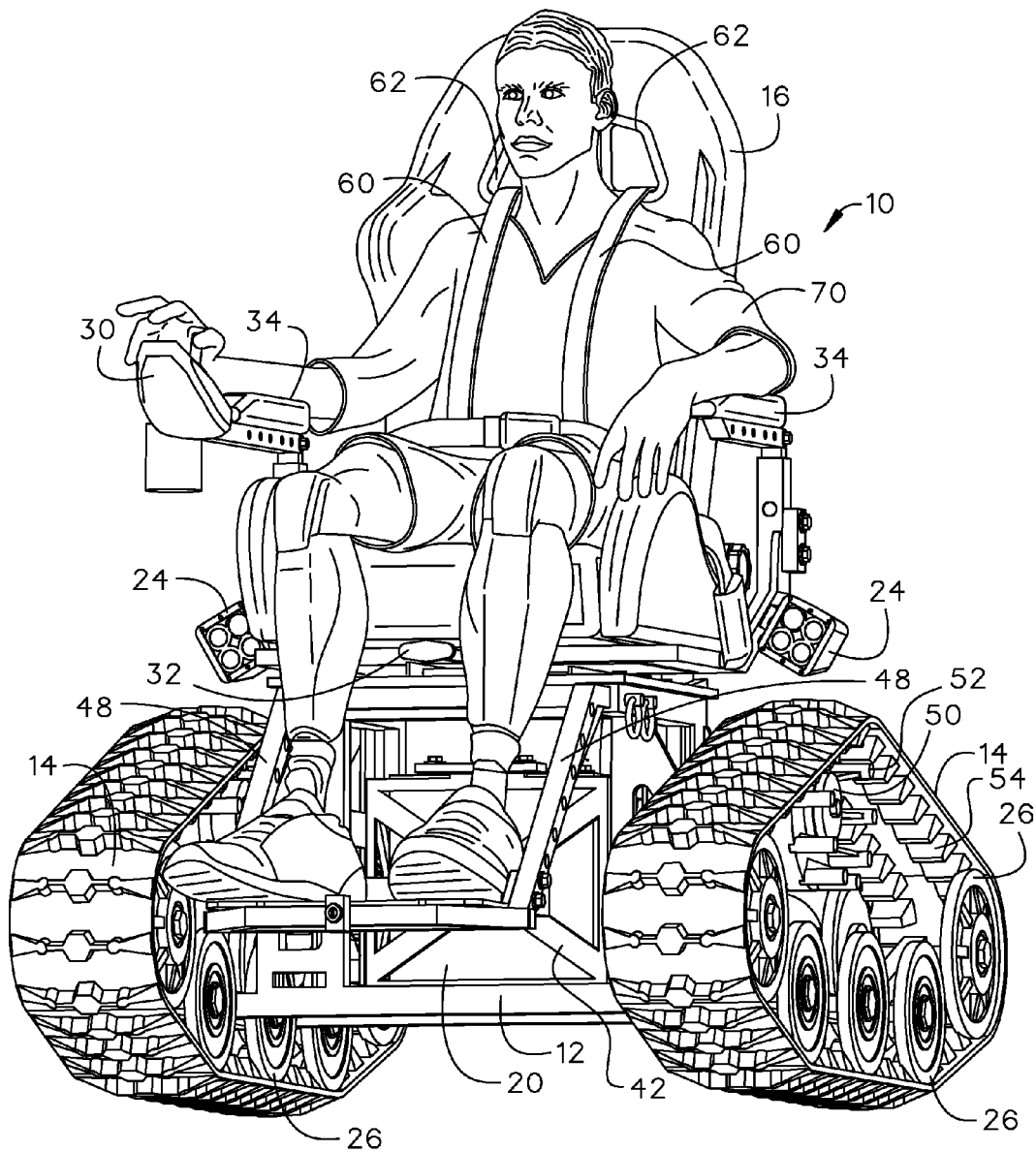
FIG. 1 is a perspective view of an embodiment of the present invention shown in use.
Figure 2:
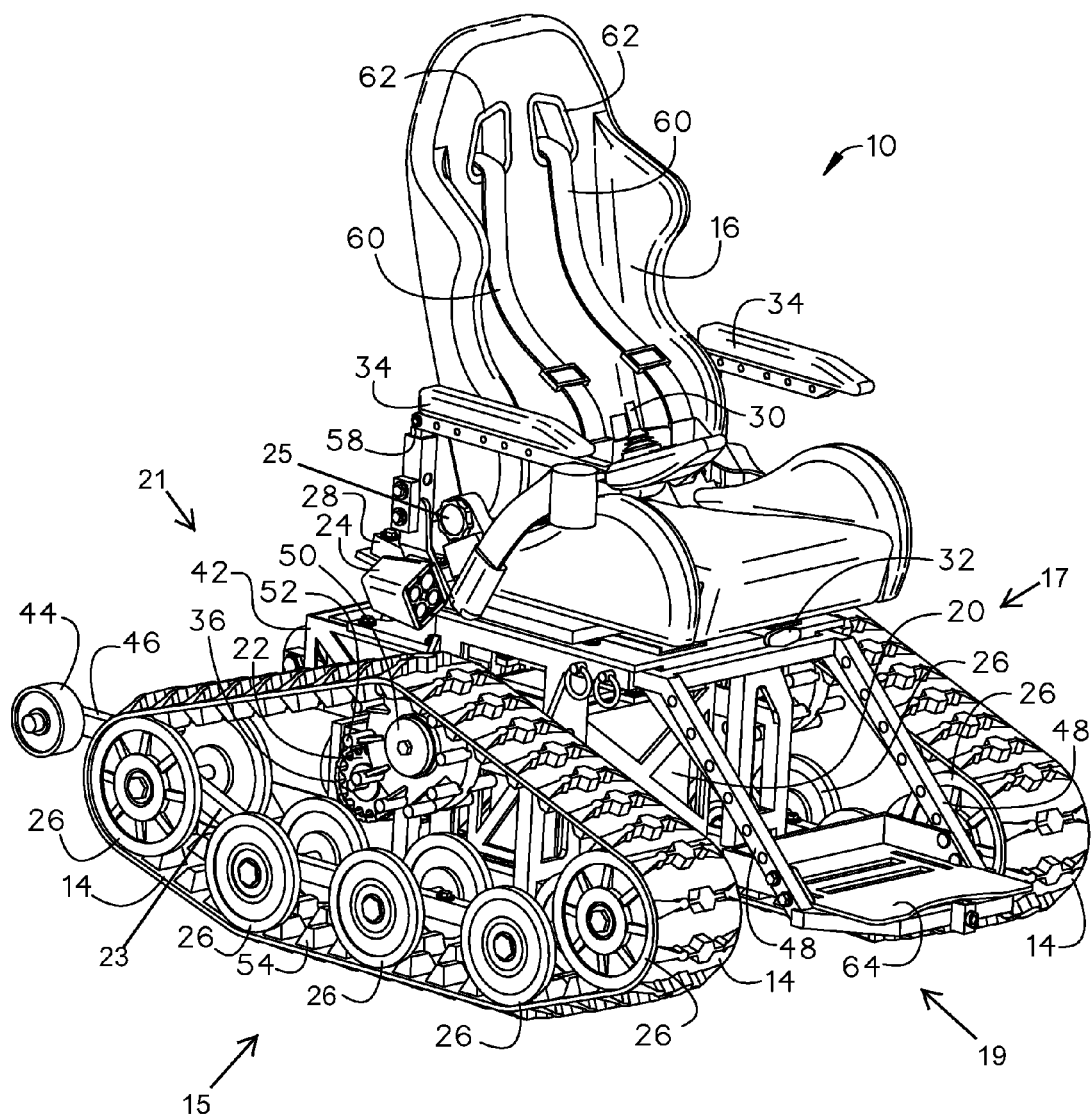
FIG. 2 is a front perspective view of an embodiment of the present invention.
Figure 3:
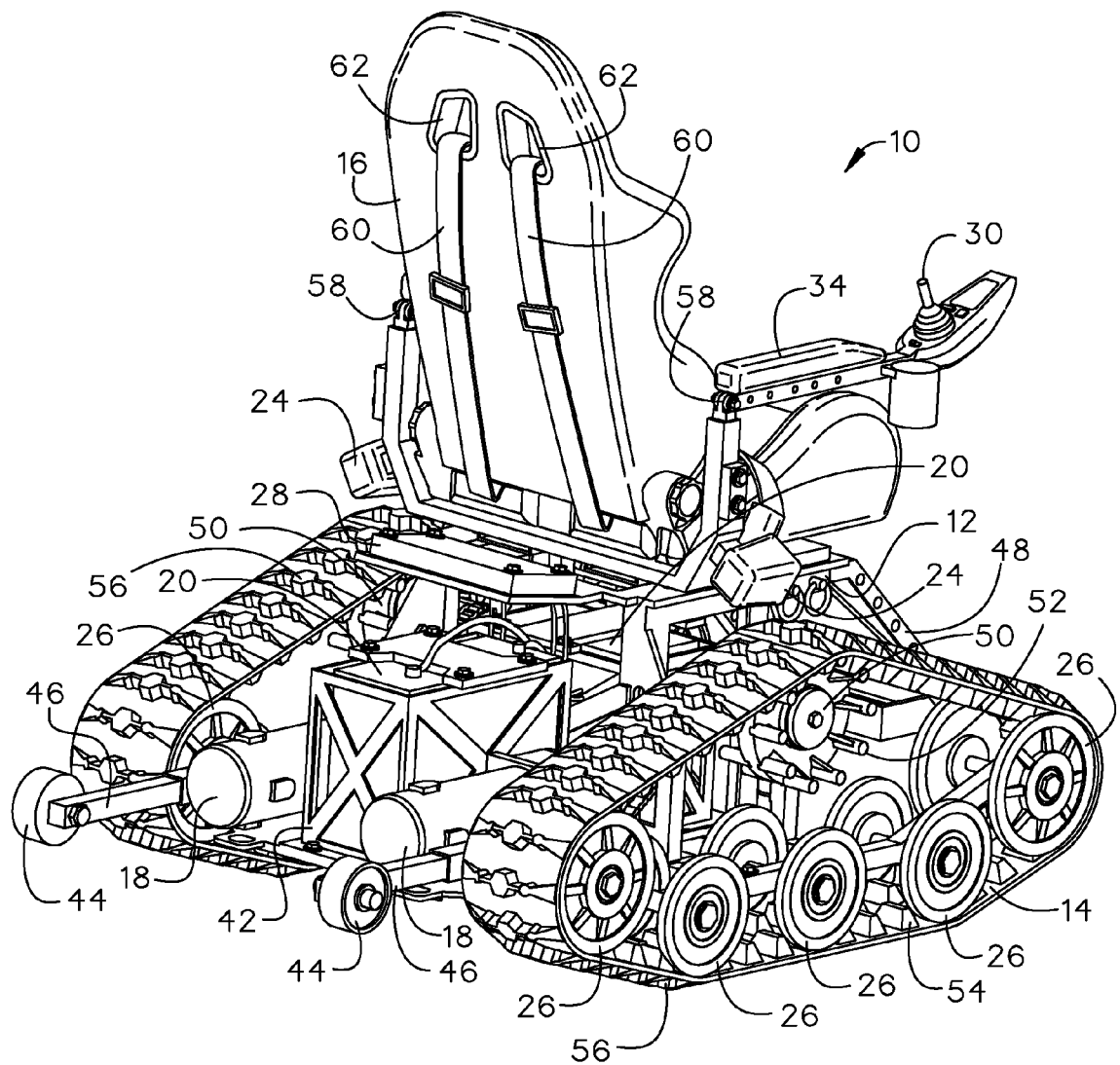
FIG. 3 is a rear perspective view of an embodiment of the present invention.
Figure 4:
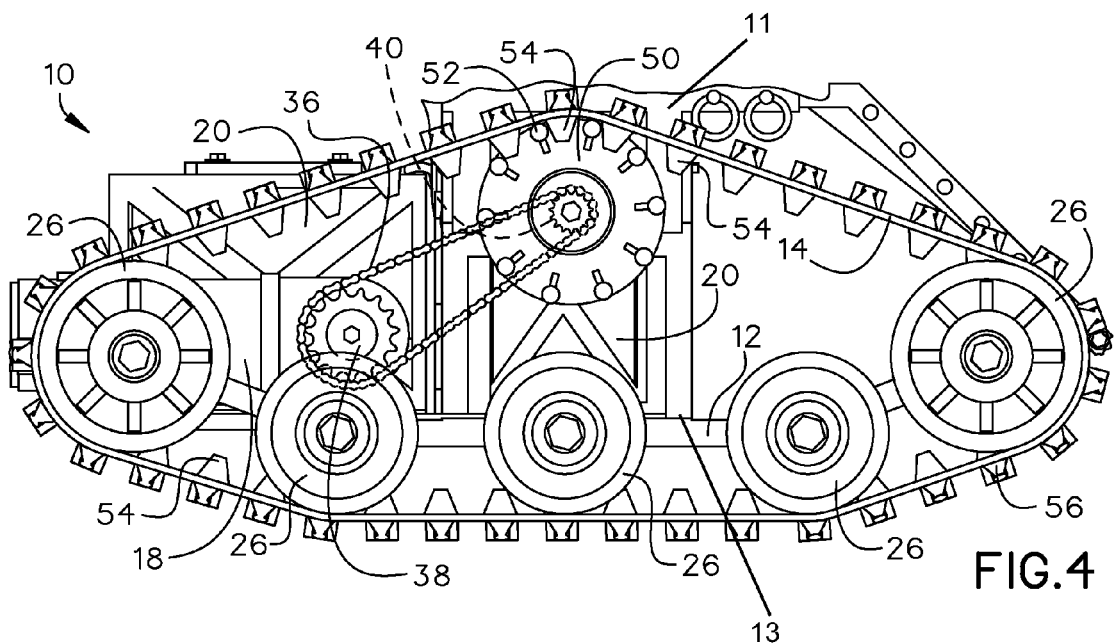
FIG. 4 is a side detail view of the present invention of the sprocket and the chain elements for illustrative clarity.
Figure 5:
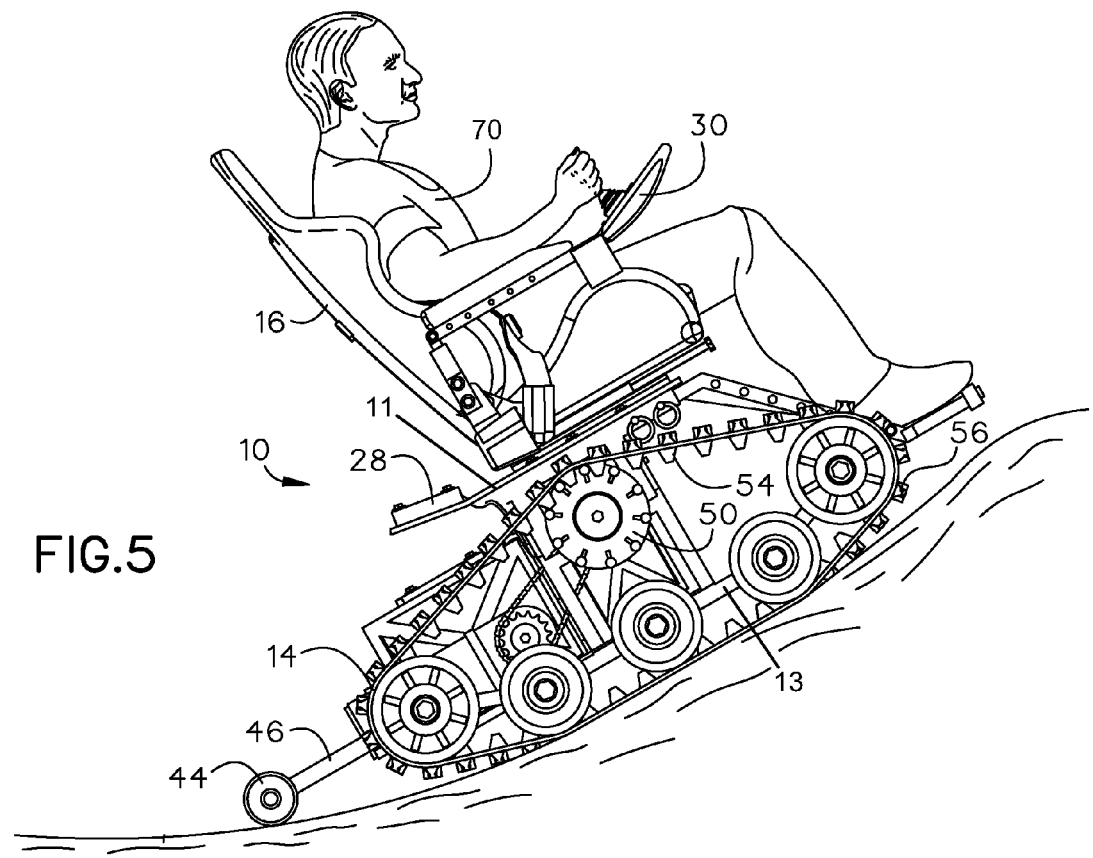
FIG. 5 is a side view of the present invention shown in use over uneven terrain.

Referring to FIGS. 1 through 5, the present invention may include an all terrain wheelchair 10. The wheelchair 10 includes a frame 12. The frame 12 includes an upper bracket 11, a lower bracket 13, a first side 15, a second side 17, a front end 19 and a rear end 21. At least one motor 18 is mounted to the lower bracket 13 of the frame 12. A first drive sprocket 22 and a second drive sprocket 22 may be disposed on the first side 15 and the second side 17 respectively. The motor 18 may rotate the first and second drive sprockets 22. A first track drive wheel 50 is rotatably connected to the first side 15 and a second track drive wheel 50 is rotatably connected to the second side 17. The first and second track drive wheels 50 each include a wheel sprocket 40 connected to the first and second drive sprockets 22 respectively by a drive chain 36. A plurality of roller wheels 26 are rotatably connected to each of the first side 15 and the second side 17. A first track 14 surrounds the plurality of wheels 26 on the first side and a second track 14 surrounds the plurality of wheels 26 on the second side. The first track 14 is driven by the first track drive wheel 50 and the second track 14 is driven by the second track drive wheel 50. The present invention may further include a seat 16 mounted to the upper bracket 11 and a controller 30 operable to control an output of the at least one motor 18 and a steering of the wheelchair 10.

The frame 12 of the present invention is the supporting structure of the present invention. In certain embodiments, the frame 12 may be made of steel or another strong material. In certain embodiments, the frame 12 may include a first wheel bracket 23 on the first side 15 and a second wheel bracket 23 on the second side 17. The wheel brackets 23 may be affixed and extend from the lower bracket 13. The first and second wheel brackets 23 may each include a raised front end and a raised rear end. Wheels 26 are rotatably connected to both the first and second wheel brackets 23.

In certain embodiments, the plurality of wheels 26 on the first side 15 and the second side 17 each include a pair of front large wheels 26 pivotally mounted to the raised front end by an axle and a pair of rear large wheels 26 rotatably mounted to the raised rear end by an axle. The present invention may further include a plurality of pairs of small wheels 26, each pair of small wheels 26 rotatably mounted in between the raised front end and the raised rear end by an axle. The first and second raised ends may support the larger wheels 26 above the ground so that terrain may be easily traversed. In certain embodiments, the present invention may include a total of twenty polymer roller wheels 26 in which the tracks 14 roll along.

The tracks 14 of the present invention may be rubber and include tread 56 that act similar to tires. The tracks 14 are attached to the wheelchair 10 under tension by the roller wheels 26, track sprockets 22, 40 and aluminum turnbuckles. The first track 14 and the second track 14 each comprise a tread 56 on an outer surface and a plurality of inner protrusions 54 on inner surface. In such embodiments, the first track drive wheel 50 and the second track drive wheel 50 each include a plurality of teeth 52 interlocking with the plurality of inner protrusions 54 of each of the first track 14 and the second track 14. Therefore, when the motor 20 drives the drive sprockets 22 and thereby rotates the track drive wheels 50, the teeth 52 and inner protrusions 54 interlock and drive the tracks 14.

In certain embodiments, the motor 18 of the present invention may include an electric motor 18. As illustrated in the Figures, the present invention may utilize two motors, one on each side 15, 17 and each rotating drive sprockets 22. In certain embodiments, the motor 18 may include a high torque 24 volt direct current motor each with 24:1 right angle gearboxes which provides thrust for the tracked wheelchair. However, the present invention is not limited to the motor mentioned above, and may use any motor that propels the wheelchair 10.

The present invention may further include at least one rechargeable battery 20. As illustrated in the Figures, the present invention may include two rechargeable batteries 20. The batteries 20 may include two 12 volt deep cycle batteries that provide electrical power for the tracked wheelchair 10. These batteries 20 may be arranged in a series configuration, which provides the electronic system with 24 volts. The batteries 20 may be enclosed in compartments 42. The compartments 42 are affixed to the lower bracket 13 of the frame 12. The present invention may further include a speed controller 28, such as a 120 Amp motor speed controller which transfers power from the batteries 20 and directs it to the motors 18 (consequently the tracks 14) to provide smooth and powerful movement of the wheelchair 10.

As illustrated in the Figures, at least one of the batteries 20 and the motors 18 may be attached to the frame 12 near the rear end 21 of the lower bracket 13. Further, the second battery 20 may be attached to the frame 12 underneath the seat 16. The orientation of the batteries 20 and motors 18 provides for a well grounded wheelchair 10. Further, utilizing a chain belt system, the first and second drive sprockets 22 and the motors 19 may be positioned below the first and second track drive wheels 50, as opposed to the motor positioned adjacent to and directly rotating the drive wheels 50. Therefore, the frame 12 and the overall wheelchair 10 may have a reduced width, such as 30 inches or less, allowing the rider to travel through narrower passageways.

The present invention may further include headlights 24. The headlights may be mounted to the seat 16 or the frames 12. The headlights 24 may be pointed in the direction of the front end 19 so that a user 70 may see what is in front of them while operating the wheelchair 10 in the dark. In certain embodiments, the lights 24 may include dual light emitting diode (LED) headlights 24 to provide an abundance of light in low light conditions. Since these LED lights are very efficient, they do not limit travel range.

The present invention may include a racing style seat 16. The padded racing style seat 16 gives the user 70 full spine support. The seat 16 features upper and lower bolstering to give the user a secure and confident experience. The seat 16 may be adjustable along the upper bracket 11 from the front end 19 to the rear end 21. In certain embodiments, the present invention may include a seat suspension. In such embodiments the seat 16 may be attached to the upper bracket 11 by a series of springs forming the suspension. An adjustment knob 32 may be turned to tighten and loosen the suspension of the seat 16. The suspension isolates much of the track vibration to provide a smooth ride to the user. Further, the back portion of the seat may be reclinable via a knob 25.

In certain embodiments, the seat 16 may include two openings 62 just above where the user's shoulders rest. The openings 62 may accommodate a dual shoulder harness 60 through the seatback. The harness 60 is attached to the seat 16 and may include at least one shoulder strap and a waist strap. The nylon racing harness 16 may include four or five attachment points depending on user preferences. The points connect at one central buckle similar to an automobile's seatbelt buckle. The harness 60 goes around the user's waist as well as both shoulders. In certain embodiments, the harness 60 is brought between the user's legs and attached to the central buckle assembly to assist users 70 who may lack core body support and may tend to slide down and out of the harness 60.

The present invention may further include a pair of arm rests 34 pivotally attached to the seat 16 by a pivot 58. The two padded armrests 34 allow the user to be more comfortable when using the wheelchair 10. The armrests 34 pivot up and out of the way to allow easy transfers in and out of the wheelchair. The controller 30 may be mounted to at least one of the pair of arm rests 34. The controller 30 may include a joystick and a touch screen interface, such as an LCD screen. The touch screen interface may provide information such as speed, battery level, and lighting options to the user.

The present invention may further include a foot platform 64 extending from the front side 15 of the frame 12. In such embodiments, bracket arms 48 may extend from the first side 15 of the upper bracket 11 downward towards the lower bracket 13. The foot platform 64 may attach to the bracket arms 48 and provide a rest for the user's feet or prosthesis. In certain embodiments, the distance from the platform 64 to the seat may be adjustable to accommodate different sized users 70.

In certain embodiments, the present invention may include at least one rear wheel 44 protruding from the rear end 21 of the frame 12 in between the plurality of wheels 26 on the first side 15 and the second side 17. An anti-rollback arm 46 may extend from the rear end 21 of the lower bracket with the rear wheel 44 attached to the anti-rollback arm 46. As illustrated in the Figures, two rear wheels 44 may be mounted to the frame 12 on the back of the wheelchair 10. The anti-rollback rear wheels 44 allow the user 30 to climb steep hills without having the unit tip back.

In use, the present invention may be controlled by the joystick and may move the wheelchair 10 forward and backwards, as well as turn left and right. The batteries 20 may power the motors 18, which in turn rotates the drive sprockets 22. When the drive sprockets 22 are rotated, the track drive wheels 50 are rotated via the drive train. The interlocking protrusion 52 and teeth 54 drive the tracks 14 about the plurality of wheels 44, which thereby propels the wheelchair 10 in a desired direction. The orientation of the motors 18 and batteries 20 as well as the drive chain system provide for a safe and maneuverable off road wheelchair 10.

The present invention may be made by the use of welding, CNC water jet cutting steel, CNC plasma cutting steel, air powered tools, hand tools, and electric powered tools. The bare metal frame may be created and powder coated. The other components are then assembled onto the main frame to complete the wheelchair build.

It should be understood, of course, that the foregoing relates to exemplary embodiments of the invention and that modifications may be made without departing from the spirit and scope of the invention as set forth in the following claims.

What is claimed is:

1. An all terrain wheelchair comprising:
 a frame comprising an upper bracket, a lower bracket, a first side wheel bracket and a second side wheel bracket extend from the lower bracket, wherein each of the first side wheel bracket and the second side wheel bracket terminate at a raised rear end and a front end, a first side, a second side;
 a plurality of wheels comprising, a pair of front large wheels rotatably mounted to the front end of each of the first side wheel bracket and the second side wheel bracket, a pair of rear large wheels rotatably mounted to the raised rear end of each of the first side wheel bracket and the second side wheel bracket, a plurality of roller wheels rotatably connected to each of the first side wheel bracket and the second side wheel bracket between the large front wheels and the large rear wheels;
 at least one motor mounted to the lower bracket and disposed in line between the pair of rear large wheels, the at least one motor comprising a first drive sprocket disposed on the first side and a second drive sprocket disposed on the second side, wherein each of the first and second drive sprockets are positioned forwardly of the rear large wheels and are rotatable by the at least one motor;
 a first track drive wheel rotatably connected to the first side and a second track drive wheel rotatably connected to the second side near a median portion of the frame, wherein each of the first and second track drive wheel comprises a wheel sprocket connected to one of the first and second drive sprockets by a drive chain;
 a first track surrounding the plurality of wheels on the first side and a second track surrounding the plurality of wheels on the second side, wherein the first track is driven by the first track drive wheel and the second track is driven by the second track drive wheel;
 a seat mounted to the upper bracket; and
 a controller operable to control an output of the at least one motor and a steering of the wheelchair.

2. The all terrain wheelchair of claim 1, wherein the first track and the second track each comprise a tread on an outer surface and a plurality of inner protrusions on an inner surface.

3. The all terrain wheelchair of claim 2, wherein the each of the first track drive wheel and the second track drive wheel comprise a plurality of teeth sequentially interlocking with the plurality of inner protrusions of each of the first track and the second track.

4. The all terrain wheelchair of claim 1, wherein the at least one motor comprises two electric motors.

5. The all terrain wheelchair of claim 4, further comprising at least one rechargeable battery mounted to the lower bracket, and electrically connected to the two electric motors.

6. The all terrain wheelchair of claim 5, wherein the battery is mounted to the lower bracket near a rear end.

7. The all terrain wheelchair of claim 1, wherein the first drive sprocket and the second drive sprocket are disposed below the first track drive wheel and the second track drive wheel.

8. The all terrain wheelchair of claim 1, further comprising at least one wheel protruding from the rear end of the frame in between the plurality of wheels on the first side and the second side.

9. The all terrain wheelchair of claim 2, further comprising a foot platform extending from a front side of the frame below the upper bracket.

10. The all terrain wheelchair of claim 9, wherein the first and second wheel brackets each terminate at a raised front end.

11. The all terrain wheelchair of claim 10, wherein the plurality of roller wheels a plurality of pairs of small wheels, each pair of small wheels mounted in between the raised front end and the raised rear end by an axle.

12. The all terrain wheelchair of claim 1, wherein the seat is a racing style seat.

13. The all terrain wheelchair of claim 1, further comprising a pair of arm rests pivotally attached to the seat.

14. The all terrain wheelchair of claim 13, wherein the controller is mounted to at least one of the pair of arm rests.

15. The all terrain wheelchair of claim 1, wherein the seat is adjustable along the upper bracket from the front end to the rear end.

16. The all terrain wheelchair of claim 1, wherein a back portion of the seat is reclinable.

17. The all terrain wheelchair of claim 1, further comprising a harness attached to the seat, wherein the harness comprises at least one shoulder strap and a waist strap.

* * * * *